US011194462B2

(12) United States Patent
Ananthakrishnan

(10) Patent No.: US 11,194,462 B2
(45) Date of Patent: Dec. 7, 2021

(54) EXCLUSION OF SELECTED DATA FROM ACCESS BY COLLABORATORS

(75) Inventor: Ganesh Ananthakrishnan, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 1067 days.

(21) Appl. No.: 13/196,990

(22) Filed: Aug. 3, 2011

(65) Prior Publication Data
US 2013/0036370 A1    Feb. 7, 2013

(51) Int. Cl.
| | |
|---|---|
| *H04W 12/02* | (2009.01) |
| *G06F 3/0488* | (2013.01) |
| *G06F 21/31* | (2013.01) |
| *H04L 29/06* | (2006.01) |
| *G06F 21/62* | (2013.01) |
| *H04W 12/06* | (2021.01) |
| *H04W 12/68* | (2021.01) |

(52) U.S. Cl.
CPC ............ *G06F 3/0488* (2013.01); *G06F 21/31* (2013.01); *G06F 21/6245* (2013.01); *H04L 63/0861* (2013.01); *H04L 63/10* (2013.01); *H04W 12/02* (2013.01); *H04W 12/06* (2013.01); *H04W 12/68* (2021.01)

(58) Field of Classification Search
CPC ....................................................... G06F 21/10
USPC ....................................................... 715/700
See application file for complete search history.

(56) References Cited

U.S. PATENT DOCUMENTS

| | | | | |
|---|---|---|---|---|
| 7,124,192 B2 * | 10/2006 | High et al. | ..................... | 709/229 |
| 7,139,807 B2 * | 11/2006 | Comstock et al. | ........... | 709/207 |
| 7,200,214 B2 * | 4/2007 | Knappe et al. | ................ | 709/204 |
| 7,340,438 B2 * | 3/2008 | Nordman | ............. | G06Q 20/382 |
| | | | | 705/51 |
| 7,565,697 B2 * | 7/2009 | LeVine | ................... | G06F 21/10 |
| | | | | 711/157 |
| 7,640,429 B2 * | 12/2009 | Huang et al. | ................. | 713/166 |
| 7,669,244 B2 * | 2/2010 | Smith | ............................ | 726/26 |

(Continued)

OTHER PUBLICATIONS

Ahmed et al., "Security Policies in Distributed CSCW and Workflow Systems", IEEE Transactions on Systems, Man, and Cybernetics—Part A: Systems and Humans, v. 40, n. 6, pp. 1220-1231, Nov. 2010; publication date May 18, 2010.*

(Continued)

*Primary Examiner* — Beau D Spratt
(74) *Attorney, Agent, or Firm* — Sheridan Ross P.C.

(57) ABSTRACT

One exemplary aspect is a blackout feature that can be used in connection with touchscreen devices to hide selected data in a shared display environment. An exemplary embodiment may be provided as a service running in the background or on a touchscreen device. A service may pop-up in response to the initiation of a collaboration session or entry of the device into a data transfer or sharing environment to prompt the user as to handle they would like to handle the shared information, e.g., "hide" sensitive information. Another exemplary aspect can display data in a constellation fashion. For example, data included in a file or data set to be shared is displayed by the touchscreen device. The user can then run their finger over the data that the user does not wish to share. The selected data/information can then be prevented from delivery to and/or display on the collaborating device(s).

20 Claims, 8 Drawing Sheets

(56) References Cited

U.S. PATENT DOCUMENTS

| | | | |
|---|---|---|---|
| 8,495,358 B2* | 7/2013 | Johnston, II | G06F 21/6209 713/153 |
| 2003/0145052 A1* | 7/2003 | Watanabe | 709/204 |
| 2004/0221037 A1* | 11/2004 | Costa-Requena et al. | 709/225 |
| 2005/0114672 A1* | 5/2005 | Duncan et al. | 713/182 |
| 2005/0246369 A1* | 11/2005 | Oreizy | G06Q 10/10 |
| 2006/0048224 A1* | 3/2006 | Duncan et al. | 726/22 |
| 2007/0009139 A1* | 1/2007 | Landschaft | H04M 1/66 382/115 |
| 2007/0030528 A1 | 2/2007 | Quaeler et al. | |
| 2007/0156836 A1* | 7/2007 | Kelso | G06Q 10/107 709/207 |
| 2007/0180029 A1 | 8/2007 | Croak et al. | |
| 2007/0208806 A1* | 9/2007 | Mordecai et al. | 709/204 |
| 2008/0077997 A1* | 3/2008 | Miyata et al. | 726/28 |
| 2008/0126953 A1* | 5/2008 | Davidson et al. | 715/753 |
| 2008/0159490 A1* | 7/2008 | Gaudin et al. | 379/88.16 |
| 2008/0284597 A1* | 11/2008 | Shah | 340/572.1 |
| 2008/0305771 A1* | 12/2008 | Yajima | H04M 1/66 455/411 |
| 2008/0307451 A1* | 12/2008 | Green | G06F 3/0482 725/25 |
| 2009/0061819 A1* | 3/2009 | Coughlan | G07C 9/00158 455/410 |
| 2009/0083544 A1* | 3/2009 | Scholnick | G06F 21/14 713/186 |
| 2009/0222518 A1* | 9/2009 | Chang et al. | 709/204 |
| 2009/0239467 A1* | 9/2009 | Gulin | G08B 5/36 455/41.2 |
| 2009/0300711 A1* | 12/2009 | Tokutani et al. | 726/1 |
| 2010/0107219 A1* | 4/2010 | Thompson | G06F 21/6218 726/2 |
| 2010/0124363 A1* | 5/2010 | Ek | G06F 21/32 382/118 |
| 2010/0235881 A1* | 9/2010 | Liu | G06F 21/6218 726/3 |
| 2011/0030067 A1* | 2/2011 | Wilson | G06F 21/6245 726/27 |
| 2011/0241872 A1* | 10/2011 | Mahaffey | H04L 41/0253 340/539.13 |
| 2012/0140681 A1* | 6/2012 | Kaminsky et al. | 370/261 |
| 2012/0151556 A1* | 6/2012 | Gilchrist et al. | 726/1 |
| 2012/0157165 A1* | 6/2012 | Kim | G06F 21/6218 455/566 |
| 2012/0212430 A1* | 8/2012 | Jung | H04M 1/72454 345/173 |
| 2012/0221963 A1* | 8/2012 | Motoyama | 715/753 |
| 2013/0023234 A1* | 1/2013 | Poon | H04W 12/02 455/411 |
| 2013/0191908 A1* | 7/2013 | Klein | G06F 21/36 726/18 |
| 2014/0075328 A1* | 3/2014 | Hansen | G06F 3/0487 715/747 |

OTHER PUBLICATIONS

Tripathi et al., "Design of a Policy-Driven Middleware for Secure Distributed Collaboration", Proceedings of the 22nd International Conference on Distributed Computing Systems (ICDCS '02), pp. 1-8, Feb. 2002.*

WordReference, definition of "change hands", www.wordreference.com, 2009.*

Bakken et al., "Data Obfuscation: Anonymity and Desensitization of Usable Data Sets", IEEE Security & Privacy, v. 2, n. 6, pp. 34-41, Dec. 2004.*

Karlson et al., "Can I Borrow Your Phone? Understanding Concerns When Sharing Mobile Phones", CHI 2009, Apr. 2009.*

Liu et al., "Design, Realization, and Evaluation of xShare for Impromptu Sharing of Mobile Phones", IEEE Transactions on Mobile Computing, v. 9, n. 12, pp. 1682-1696, Dec. 2010.*

Raymond, "Data Obfuscation for Test Environments", www.xensight.com, May 2010.*

Stajano, "One user, many hats; and, sometimes, no hat—towards a secure yet usable PDA", B. Christianson et al. (Eds.): Security Protocols, LNCS, 2005.*

Tyma, "Encryption, hashing, and obfuscation", http://www.zdnet.com/article/encryption-hashing-and-obfuscation/, Apr. 2003.*

Zhu, "Concepts and Techniques in Software Watermarking and Obfuscation", Doctoral thesis, University of Auckland, Aug. 2007.*

Balasaygun, Mehmet C. et al., "Methods and Systems for Selectively Sharing Content," U.S. Appl. No. 12/916,082, filed Oct. 29, 2010.

* cited by examiner

EXCLUSION OF SELECTED DATA FROM ACCESS BY COLLABORATORS

FIELD

An exemplary aspect is directed toward enhanced communications. More specifically, an exemplary aspect is directed towards the ability to selectively prevent access to or disclosures of information through a user-friendly interface that may optionally include fail-safe provisions.

RELATED ART

Users can manually select files for delivery to another device. In addition, shared directories of information can be defined. Information within particular files can also be manually selected, for example, through cut-and-paste operations, with materials selected individually or with the support of search operations. Presently, data for sharing is selected manually. In addition, applications and data can be made selectively available depending on user login credentials.

SUMMARY

However, there are often situations in which parties desire to share information between their respective devices with parties wanting to often limit the access that the other has to data maintained on their device. In addition, mechanisms for sharing information between devices lack fail-safe procedures that allow users to verify that only information intended to be shared is being provided to the other party.

Existing technologies do not provide a solution to the above problem. In addition, they can present shared information in a way that makes obvious to the viewer that certain information has been redacted and/or in a way that is not esthetically pleasing. Other systems are limited to preventing the unauthorized disclosure of information in the form of e-mail attachments, however they do not address the problems noted above.

One exemplary aspect addressed by the present disclosure is a blackout feature that can be used in connection with touchscreen devices to hide selected data in a shared display environment. An exemplary embodiment may be provided as a service running in the background or on a touchscreen device. A service may pop-up in response to the initiation of a collaboration session or entry of the device into a data transfer or sharing environment to prompt the user as to how they would like to handle the shared information, e.g., "hide" sensitive information.

Another exemplary aspect can display data in a constellation fashion. For example, data included in a file or data set to be shared is displayed by the touchscreen device. The user can then run their finger over the data that the user does not wish to share. The selected data/information can then be prevented from delivery to and/or display on the collaborating device(s). The corollary is true too, i.e., selected data can then be included into the delivery based on a choice, depending on the amount of data to be presented.

The data remaining after the selection of data subject to "blackout," e.g., not being shared, can be reconfigured by the service. For example, where a single column of a three column spreadsheet has been blacked out, the service can reconfigure the spreadsheet as a two-column spreadsheet such that it is not as obvious that data has been blacked out.

The background service can optionally also provide a user with a preview of the data remaining after the application of the blackout feature, prior to providing that information to a collaborating, shared, or other device. The user can then confirm that the selection is appropriate, or edit the selection before finalizing delivery to the other device and/or modify the reconfigured display of the data that was not blacked out. In still another aspect, a reflective feature may be supported, in which the displays between communicating/shared devices are identical, to allow for verification that only appropriate data is being shared.

These exemplary blackout capabilities can also be applied to device features. For example, an application file on a first device can be shared with a second device, even if the second device does not support the shared file format. In such situations, the second device can be provided with a viewer application, rather than a full application associated with the file. As another example, types of data that are shared can be limited. For example, a first device participating in a video call with a second device can share audio data with a third device. In yet another exemplary scenario, a deal sheet on which the features or parameters of a transaction or potential transaction are set forth to be partially shared with another party. As in yet another example, a car dealer may prepare a sheet that lists various incentives and/or extras that can be provided in connection with the sale of a car. Those items can be selectively shared with a potential buyer, without it being obvious to the potential buyer that at least certain items have been omitted from a displayed offer. Moreover, modifications to the items offered in connection with a particular negotiation can be made.

In accordance with some of these exemplary embodiments, drawbacks of the current art being that they are cumbersome to use, and lack fail-safe features, can be overcome. Moreover, and in addition, existing systems are incapable of controlling access to different types of applications, data and/or features, and produce results that often make it obvious to other parties that material has been redacted, edited, hidden, or blacked out.

Another exemplary aspect is directed toward a collaborative work-sharing environment where information shared between a plurality of displays is not the same. More specifically, information shown on a first display can include additional information that is one or more of not shown, obfuscated and reconfigured on a second (or more) display.

Additional aspects relate to providing an enhanced user interface that allows a user to select which one or more portions of the displayed data should be shown on another device.

In accordance with one exemplary embodiment, in which information is shared between a plurality of screens, information on the screen of the first device is different than the information on the screen of the second device. This could be particularly advantageous in situations where certain information in a shared screen environment is desired to be shared, while other information is to be hidden, obfuscated, or otherwise protected from viewing on the screen of the second device.

As will be appreciated, these basic concepts can be extended when a singular device is shared between one or more individuals. For example, the device can show certain information when being viewed by a first individual, second, different information displayed, when being viewed by a second individual, third, and even further different information displayed when being viewed by a third individual, and the like. The different information can be entirely different, or there can be some commonality between the types of information that is shown to all of the individuals, with some information being hidden, obfuscated, or otherwise protected from viewing.

There are several different exemplary ways in which it can be determined who the device is associated with. In accordance with a first exemplary embodiment, a screen is provided that asks a user to select who they are. Upon selection of who they are, the appropriate information is displayed to them. In accordance with another exemplary embodiment, an "owner" or "manager" of the device can manually select, for example, when they are handing the device to another individual, which information should be shown. In accordance with another exemplary embodiment, for example on devices that include fingerprint scanners, when a user is handed the device they scan their fingerprint which then notifies the device that a different user is viewing the information on the screen. For example, different profiles can be established such that for a known fingerprint it is assumed that the user viewing the device is the owner or manager, and for any other unknown fingerprint, it is someone else and therefore certain portions of information are hidden, obscured or otherwise restricted or modified from viewing in by other person(s).

In accordance with yet another exemplary embodiment, the device can be provided with a motion detector, such as an accelerometer, GPS, or the like. In accordance with yet another exemplary embodiment, an area could be defined, such as a geofence, around a particular area. Should the device leave that geofenced area, the device could automatically switch to displaying the second, or modified, content. As an even more specific example, assume a geofence is defined generally in the vicinity of a sales person's desk. If the sales person were to hand a device with a display to a potential customer, who is located on the showroom floor, as the device exits the geofence boundary as it is being handed to the customer, the device could switch to displaying a second set of information with the device optionally reverting back to the "sales person's" view when it is back in the geofenced area that generally corresponds to the sales person's desk. This can be coupled with a protection mechanism that controls how and when the screen(s) reverts back to the "original" information. For example, even if the device enters a geofence area, there can be an extra authentication, such as a password, before the original information is displayed.

In accordance with another exemplary embodiment, the toggling between information to be displayed can be manually selected through, for example, a button provided on a graphical user interface of the device itself. Moreover, and to insure the correct information is being displayed, in accordance with another exemplary embodiment, an "test" button can be provided that allows a user to test which information will be displayed when the item is being viewed by another party(s).

In accordance with another exemplary embodiment, electrical characteristics associated with the device can be monitored to assist with determining when the device is changing hands between individuals. For example, one or more of electrical, inductive and resistive tests can be performed, appreciating that how a user holds the device has a corresponding change in the resistive and/or inductive properties associated with, for the example, the case of the device, with these changes being correlatable to a change in user. Then, and as discussed above, differing information can be shown based on the detection that the device is being held by someone else.

In accordance with another exemplary embodiment, one or more rules are established such that certain types of information can be obscured when the information is being viewed by another party. For example, sensitive information such as a social security number, could be hidden from view by another user, when the device is being viewed by someone who the owner may not want to disclose this information to. For example, the device can be equipped such that the owner or manager of the device can turn these capabilities on and off, as needed, to assist with preserving the confidentiality and/or dissemination and/or viewing of certain information on the device by others. For example, if the owner of a device would like to share a chat session with another person, and shows that chat session to the other person, the rules can be invoked before the screen of the device is shown to the other person, with the rules controlling the hiding, obfuscating, or otherwise protecting of confidential information from being viewed by the other party. As an example, a social security number that appears in a chat session could be replaced with X's, as well as any other information, as identified by the rules as being confidential, shielded, or otherwise hidden from view.

In accordance with another exemplary embodiment, the interface of the device is enhanced to streamline the process by which the user can select which information should be hidden from view from one or more other users. More specifically, and say for example a product table is being displayed on the device. The user can swipe their finger (assuming the device has a touch-screen) over the portions of the table that they would like to have hidden, those portions then being highlighted indicating they will be hidden when the screen is toggled to be presented to another user. In conjunction with this is an optional feature of being able to reformat the presented information such that it is not readily apparent that information has been removed, hidden, or otherwise obscured. For example, if three columns of a six-column chart are selected to be hidden upon presentation to another person, when the chart is presented to the other person, the chart could be re-centered on the screen relative to the three displayed columns such that the chart appears centered, and appears "normal" such that it is not readily apparent that information has been hidden.

It should be appreciated that other formatting techniques can be used to further assist with modifying the enhanced view that is presented to others, such as re-centering, re-formatting, replacing hidden content with other content, replacing hidden content with misleading content, replacing some sensitive characters with other characters, re-drawing one or more objects, and the like.

In accordance with another optional exemplary embodiment, a device can be provided with a hidden trigger that allows the switching back and forth between the screen that has information hidden, and a screen that has all of the information available for viewing. For example, and in accordance with one exemplary embodiment, a certain combination of keystrokes unlocks the device such that all the information is displayed as normal. Re-entry of that certain sequence of keystrokes then hides the information that is determined to be sensitive, or is otherwise not to be displayed or viewed by another.

In accordance with another exemplary embodiment, if an application file on a first device is not supported on a second device, but a user wishes to share the file from the first device on the second device, the second device can be provided with a viewer application, rather than the full application associated with the file.

Accordingly, aspects are directed toward information sharing.

More specifically, aspects are directed toward limiting information shared between, for example, one or more devices, or multiple screens associated with a single device.

More specifically, aspects are directed toward limiting displayable information or data shared between, for example, one or more devices, or multiple screens associated with a single device.

More specifically, aspects are directed toward limiting voice information or data shared between, for example, one or more devices, or multiple screens associated with a single device.

More specifically, aspects are directed toward limiting video information or data shared between, for example, one or more devices, or multiple screens associated with a single device.

Even further aspects are directed toward hiding, obscuring or otherwise obfuscating information before it is displayed to one or more other parties.

Even further aspects are directed toward providing an enhanced user interface that allows for information to be selectively identified as information that is to be hidden prior to the presentment of that information to one or more other parties.

Even further aspects are directed toward modifying information, which has one or more portions thereof hidden, such that the modified information has been reformatted so that it is not evident that portions thereof have been hidden.

Even further aspects are directed toward providing certain information on a first screen, and a reduced portion of that information on one or more other screens.

Additional aspects are directed toward replacing sensitive information with misleading information, when the sensitive information would normally be being viewed by another party.

Even further aspects are directed toward establishing one or more rules, the rules governing how information is to be displayed on one or more screens, the rules in general controlling whether sensitive information should be one or more of obfuscated, hidden, replaced, or otherwise concealed from viewing.

Another exemplary aspect is directed toward establishing one or more hierarchal levels, each hierarchal level having a preconfigured policy that governs the display of information, one or more individuals being assignable to the one or more hierarchal levels and reading one or more rules (associated with a hierarchal level) and performing one or more of the hiding, obfuscating or replacing of the sensitive information.

Even further aspects are directed toward using one or more of automation algorithms or script(s) to obfuscate and/or control the display of the information.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any non-transitory, tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, DVD, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, this disclosure is considered to include a tangible storage medium or distribution medium and prior art-recognized equivalents and successor media, in which the software implementations of the present embodiments are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the embodiments are described in terms of exemplary embodiments, it should be appreciated that individual aspects of the embodiments can be separately claimed.

The preceding is a simplified summary of the embodiments to provide an understanding of some aspects of thereof. This summary is neither an extensive nor exhaustive overview of the various embodiments. It is intended neither to identify key or critical elements of the embodiments nor to delineate the scope of the embodiments but to present selected concepts of the embodiments in a simplified form as an introduction to the more detailed description presented below. As will be appreciated, other embodiments are possible utilizing, alone or in combination, one or more of the features set forth above or described in detail below.

BRIEF DESCRIPTION OF THE DRAWINGS

The exemplary embodiments disclosed herein will be discussed with relation to the following figures wherein.

DETAILED DESCRIPTION

Techniques will be illustrated below in conjunction with an exemplary electronic device or system. Although well suited for use with, e.g., a system using a computer/electronic device, server(s), communications devices, gaming device, touchscreen mobile devices and/or database(s), the embodiments are not limited to use with any particular type of electronic device(s), system or configuration of system elements. Those skilled in the art will recognize that the disclosed techniques may be used in any combination of one or more applications/device(s) in which it is desirable to hide certain information from viewing by another party(s).

The exemplary system and methods will also be described in relation to software (such as drivers), modules and associated hardware. However, to avoid unnecessarily obscuring the present disclosure, the following description omits well-known structures, components and devices that may be shown in block diagram form, are well known, or are otherwise summarized.

For purposes of explanation, numerous details are set forth in order to provide a thorough understanding of the embodiments. It should be appreciated however, that the techniques disclosed herein may be practiced in a variety of ways beyond the specific details as set forth herein.

As can be appreciated by one skilled in the art, although specific methods and techniques have been described for limiting the dissemination of information to another device, or another screen, the disclosure is not limited to the disclosed techniques.

Figure 1:
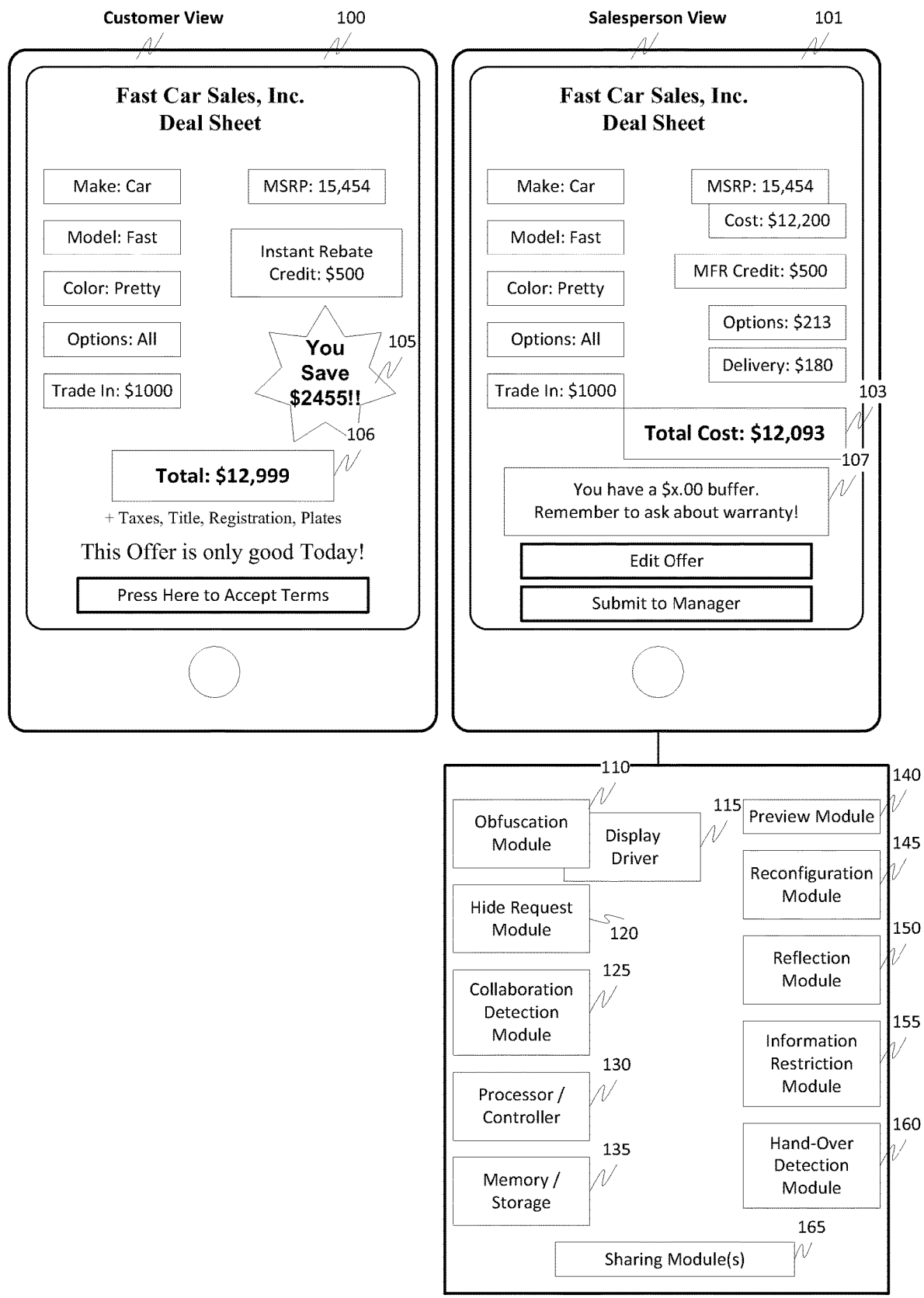
FIG. 1 illustrates an exemplary display device.

FIG. 1 illustrates two exemplary display devices, 100 and 101. These display devices can be any type of device, such as a communication device including, but not limited to, a cell phone, mobile phone, smart phone, enterprise phone, cordless phone, desktop phone, soft phone, computer, personal computer, tablet PC, netbook, touch-screen equipped device, tablet computer, pad computer, a computer associated with one or more logical or physical displays, a computer associated with a display and a projector, or any combination thereof. It should be appreciate that the display devices 100 and 101 need not necessarily be limited to communications devices, but in general, can be any type of electronic device having one or more displays, such as a touch-screen device, where it is desired to hide or otherwise obfuscate certain information.

In general, each display device 100, 101, in addition to well known componentry, includes a display or touchscreen and modules including, but not limited to, an obfuscation module 110, a display driver 115, a hide request module 120, a collaboration detection module 125, processor/controller 130, memory/storage 135, preview module 140, reconfiguration module 145, reflection module 150, information restriction module 155, hand-over detection module 160 and sharing module 165.

For ease of discussion and convenience, the following exemplary embodiments will be directed toward two display devices, both equipped with touchscreens and a display for the display of various types of information. This information can include any type of information including one or more of data, an application(s), license information, communication session information, multimedia session information, one or more documents, contacts, music, pictures, a chat session, a browsing session, video, or some portion thereof, and in general can display any type of information in any format. For ease of illustration the underlying network(s) and communication channels that can be used to assist with the exchange, mirroring or sharing of information between the devices has been omitted for clarity, but it should be appreciated that any type of wired or wireless network, or communication protocol(s) can be used to exchange information between the devices. As discussed, this can include one or more of WiFi, Bluetooth®, IR, the internet, a wide-area network, a local area network, one or more port replicators, or any combination thereof.

Furthermore, and for ease of illustration, such devices as communications switches, media servers, streaming servers, gateways, communications networks, and other types of network devices have also been omitted for clarity.

Additionally, it should be appreciated that the displayed devices may optionally include other elements such as a speaker, a microphone, a handset, a dedicated telephony-like display, a soft or hard keypad, as well as various of hard or soft buttons that enable, for example, various functionality of the device to be manipulated.

The first exemplary embodiment will be discussed in relation to the display devices 100 and 101 shown in FIG. 1. However, as is to be appreciated, while two different display devices are shown, the display device 100 being a customer view and display device 101 being a salesperson view, it should be appreciated that the functionality could be performed on a single device, on two devices, as shown in FIG. 1, or a plurality of devices with equal success. In the example shown in FIG. 1, two exemplary display devices are shown with these display devices being usable in, for example, a car sales environment. In accordance with this exemplary embodiment, the display devices are handheld communication devices that include a touchscreen interface controlled by display driver 115. As should also be appreciated, the display device 100 can have comparable hardware and modules associated therewith similar to display device 101.

In this particular exemplary embodiment, certain information to which the sales person is privy, and displayed in the sales person view on display device 101, is not to be shared with the customer viewing the interface on display device 100. In particular, certain information can be shared, such as make, model, color, options, trade-in value, MSRP, and the like. However, certain information may be confidential so that only the sales person should be privy to it, which may include cost information, manufacturer credit information, option cost information, delivery cost information, total cost information, as well as sales tips reminders such as reminding the sales person to ask the customer about an extended warranty, and informing them how much of a buffer they have in the total cost of the car. In this particular exemplary embodiment, the graphical user interfaces shown on the display devices 100 and 101 can be preconfigured forms established by, for example, a dealer, with the various fields tagged or otherwise identified as being a shared field (e.g., shared by the customer and sales person), or proprietary field, such as the cost field, that is to only be viewed in the sales person view.

Therefore, an exemplary scenario that could play out during negotiations for purchasing a vehicle could be that a customer comes into a dealership and selects a car and various options they would like. The customer can also supply information such as whether or not they have a trade-in, with this information being enterable by a sales person in an interface (not shown) on, for example, display device 101. For example, a form could be provided that allows the sales person to enter this information which is then used to assist with the population of the fields in the sales person view on display device 101. Upon entry of the various information, the sales person could ask the customer if they could share the "deal sheet" on their display device 100. If the customer agrees, and in cooperation with the display driver 115, processor/controller 130, memory/storage 135, and sharing module 165, the information identified as being sharable is sent to the customer's display device 100 for viewing thereon. In this particular exemplary embodiment, and as discussed, certain information is only for the sales person's view, including the cost and options field, while on the customer view, on display device 100, other information is shown including instant rebate credit information, misleading information 105, and the total cost for the customer 106.

More specifically, and in cooperation with the hide/request module 120, reconfiguration module 145, and collaboration detection module 125, information displayed on display device 100 is the information identified as being sharable, such as the make, color, model, and option information, and also includes other information such as the instant rebate information, misleading information 105, and total cost information 106.

Even more specifically, reconfiguration module 145 assists with populating the information in the customer view such that it appears that no information is being hidden and the interface appears "normal." As the deal continues to progress, it should be appreciated that the sharing module 165 can continue to update the information in the customer view, as, for example, a sales person uses the edit offer button and "submit to manager" button to perhaps refine the terms of the deal. This information can be updated, for example, in real-time in the customer view interface with information such as the misleading information 105, and total cost information 106, being updated as appropriate. In order to complete the sales contract, the customer can, for example, press the "press here to accept terms" button which could then finalize the sales contract in accordance with the terms shown in the customer view.

As discussed, while the embodiment illustrated in FIG. 1 is directed to the sharing of information on two devices, the same device could be used for both the sales person view and the customer view in conjunction with the hand-over detection module 160 and optionally the preview module 140. Even more specifically, and to assist with ensuring the appropriate information is being shown to a customer, the sales person could press the button (illustratively shown in FIG. 4 as show/preview/toggle button 450) that allows the sales person to toggle between the sales person view and the customer view on the same device. Therefore, if for example, a customer did not have a device of their own, the sales person could press the preview button, and in cooperation with the preview module 140, the information shown on the display device 101 changed from the sales person view to the customer view. The sales person could then hand the display device 101 to the customer to further negotiate terms of the contract and to show the customer the relevant information regarding the car they are considering purchasing.

In accordance with another exemplary embodiment, and in cooperation with the hand-over detection module 160, the display device 101 can detect the handing-over of the device from, for example, the sales person to the customer. For example, and as discussed, this hand-over detection can be based on one or more of electrical information, resistive change information, inductive change information, biometric information, such as fingerprint information, location information, geofence information, or in general any detectable characteristic that would indicate the display device 101 is no longer associated with the first person, but is instead associated with a second person. For example, the display device 101 could include a fingerprint scanner, where upon scanning of the sales person's fingerprint, the display device could display the information as shown in the sales person view in FIG. 1. Upon the handing over of the display device to a second person, such as a customer, the screen could optionally go blank (for example based on user input) until the identity of the second person is confirmed. For example, the customer could scan their fingerprint, with the display device 101 recognizing that it is not the sales person's fingerprint and thereby assuming it is a customer, who should be displayed the information as shown in the customer view on display device 100 in FIG. 1. In this manner, the information tagged as being proprietary or confidential, is not shared, yet the relevant information that allows for the negotiation and possible purchase of the vehicle, is provided. Upon the display device being returned to the sales person, the sales person could scan their fingerprint and with the hand-over detection module 160, cooperating with the processor 130 and memory 135, the fingerprint recognized as the sales person's fingerprint, with the sales person's view information again being displayed on display device 101.

Figure 2:
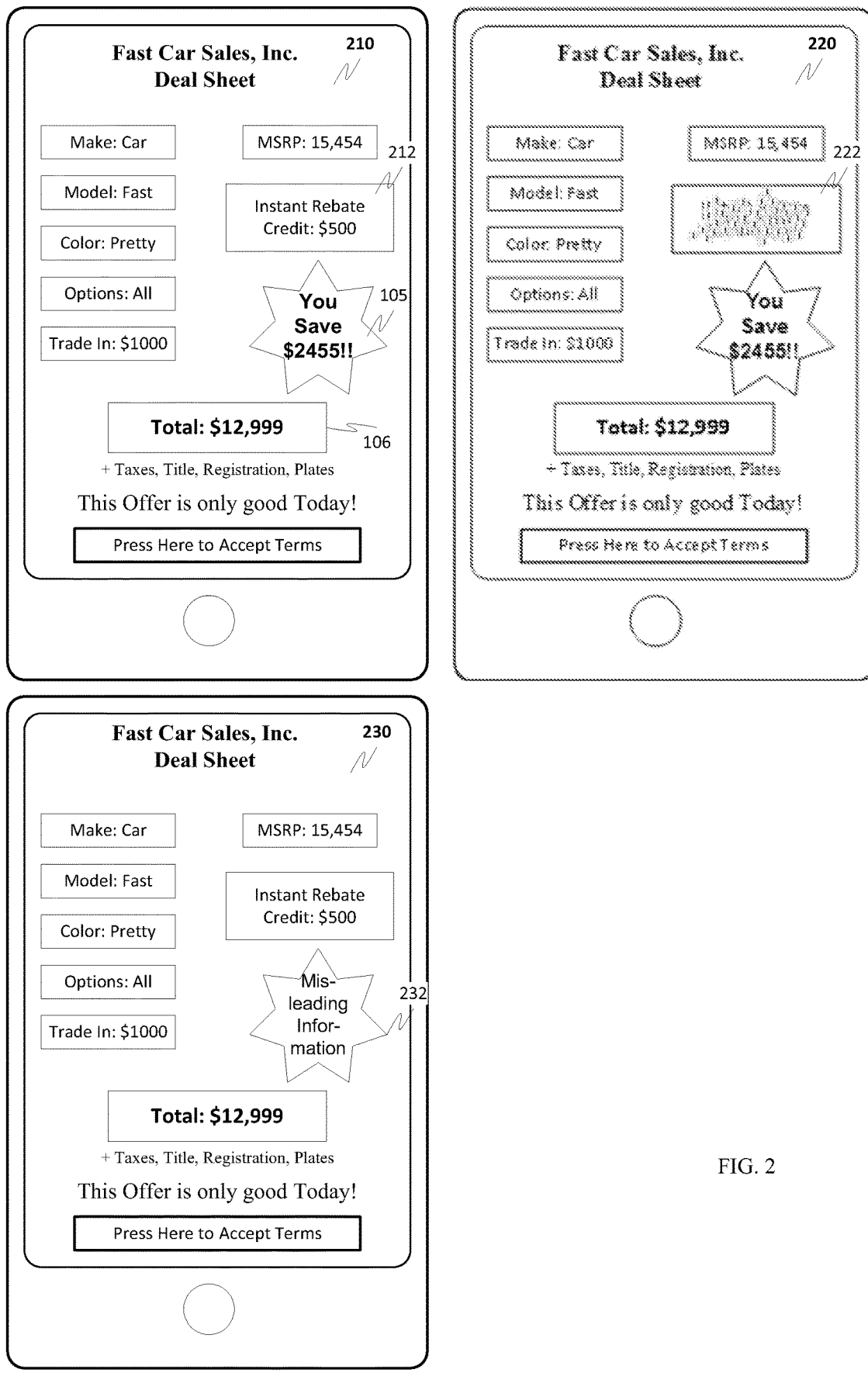
FIG. 2 illustrates exemplary methods for hiding information.

FIG. 2 illustrates three exemplary graphical user interfaces 210, 220 and 230, that illustrate various features for maintaining the confidentiality of proprietary or sensitive information. For example, on graphical user interface 210, which is similar to the customer view as shown on display device 100 on FIG. 1, instant rebate credit information 212 is shown along with the misleading information 105, and total cost information 106. Here, and in cooperation with the configuration module 105, the instant rebate credit field and the misleading information field 105 are populated to fill in the space in the interface that would otherwise have been population with the cost, manufacturer credit, options and delivery information, as shown in the sales person view on display device 101 in FIG. 1. Here, reconfiguration module 145 populates these fields to assist with making the interface look normal, balanced and hiding the fact that information may have been changed from what was viewable by sales person in the sales person view.

Another exemplary embodiment allows the obfuscation of certain information, in cooperation with the obfuscation module 110 and display driver 110. Even more specifically, in graphical user interface 220, the instant rebate credit field 222 has been obfuscated or otherwise blurred, manipulated or modified such that the information therein is no longer readable. As yet another example, and as illustrated in the graphical user interface 230, one or more portions of information can be inserted anywhere in the graphical user interface, such as the misleading information block 232, that can include any type of information that may or may not be relevant to the underlying reason for the information being displayed in the first place. In this particular example, a car dealer may use this real estate of the graphical user interface to insert puffery to assist with pushing the sale of a vehicle.

Figure 3:
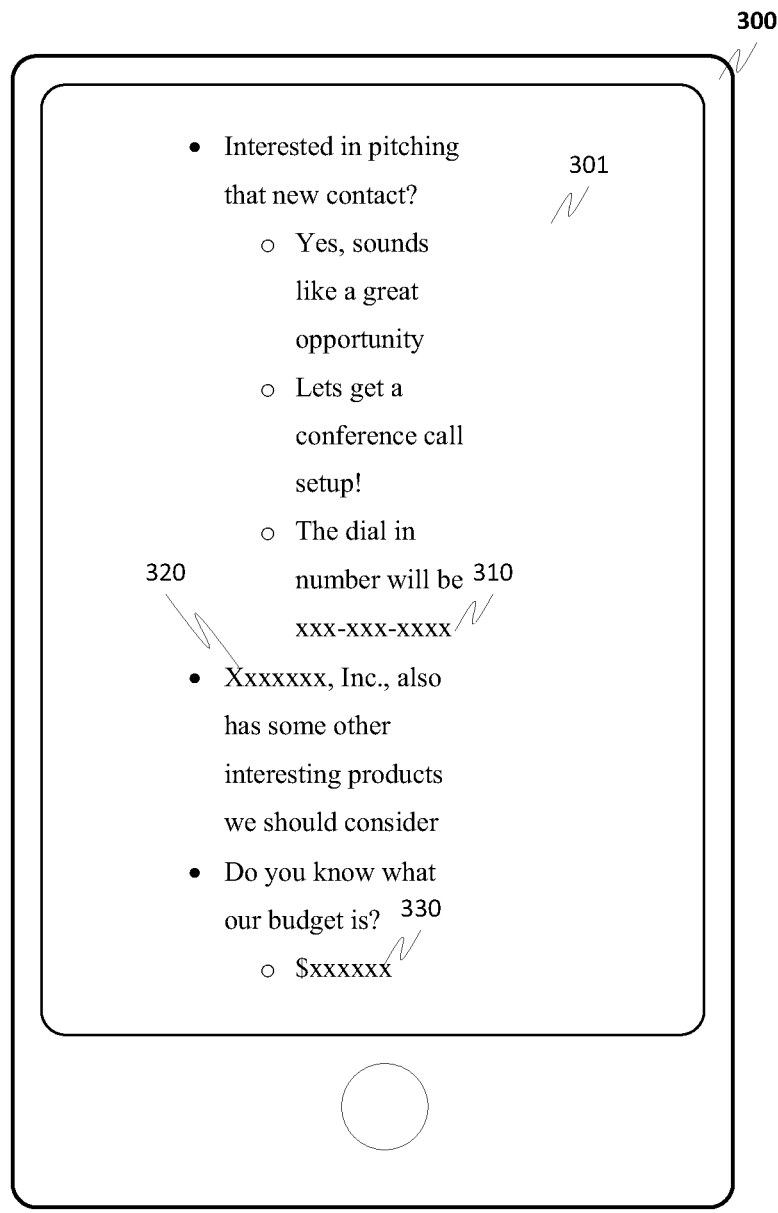
FIG. 3 illustrates yet another method for hiding information.

FIG. 3 illustrates another exemplary embodiment of a display on display device 300 that includes different types of information. In this particular exemplary embodiment a dialogue 301 is shown that includes certain information that has been obfuscated in cooperation with the obfuscation module 110, processor 130 and memory 135, which stores a rule set. In this particular exemplary embodiment, and as discussed above, rules can be utilized that assist with filtering certain information such that the information is not viewable to one or more parties. In this particular exemplary embodiment, the phone number information 310, company information 320, and price information 330 have all been replaced with "X," in cooperation with the obfuscation module 110 and display driver 115. As another optional feature, and in cooperation with the reflection module 150, the information displayed on one or more devices can be synchronized such that a first person is seeing what is being shown to one or more other people. In this way, it can be ensured that the obfuscation module is directly hiding the information that is tagged or identified as sensitive or should otherwise not be shared.

Figure 4:
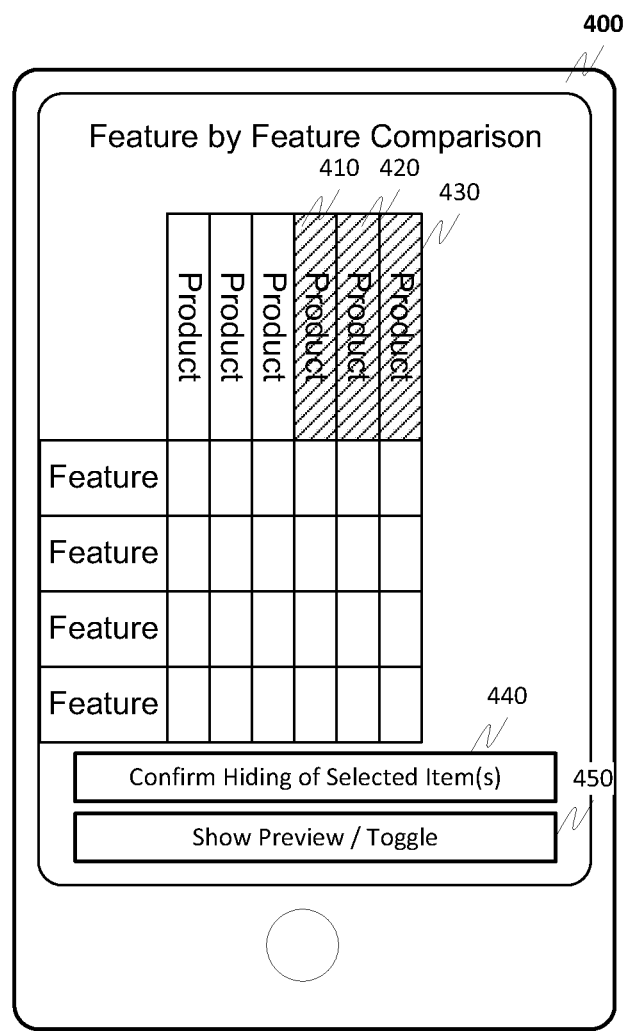
FIG. 4 illustrates a graphical user interface where certain information has been selected for hiding.

FIG. 4 illustrates an exemplary graphical user interface 400 on a display device that assists with helping a user identify certain information that is sensitive. More specifically, and in cooperation with the obfuscation module 110, display driver 115, processor 130 and memory 135, a featured chart is shown in a graphical user interface 400. Here, the user would like to hide product information associated with products 410, 420 and 430 and the various features associated with each of those respective products. In this exemplary embodiment, the user can touch the touchscreen, thereby selecting products 410-430, which can then be highlighted as illustrated in FIG. 4. Button 440 can then be selected that tags products 410-430 as sensitive information, which would then be hidden when this screen is toggled between a first view and a second view. For example, and upon selection of the show/preview/toggle button 450, the above modules will coordinate the re-generation of the information in the graphical user interface such that information tagged or otherwise identified as being sensitive is hidden. Upon selection of the show/preview/toggle button 450 again, all information, including the sensitive product information 410-430, can be shown to allow, for example, further editing as needed.

Figure 5:
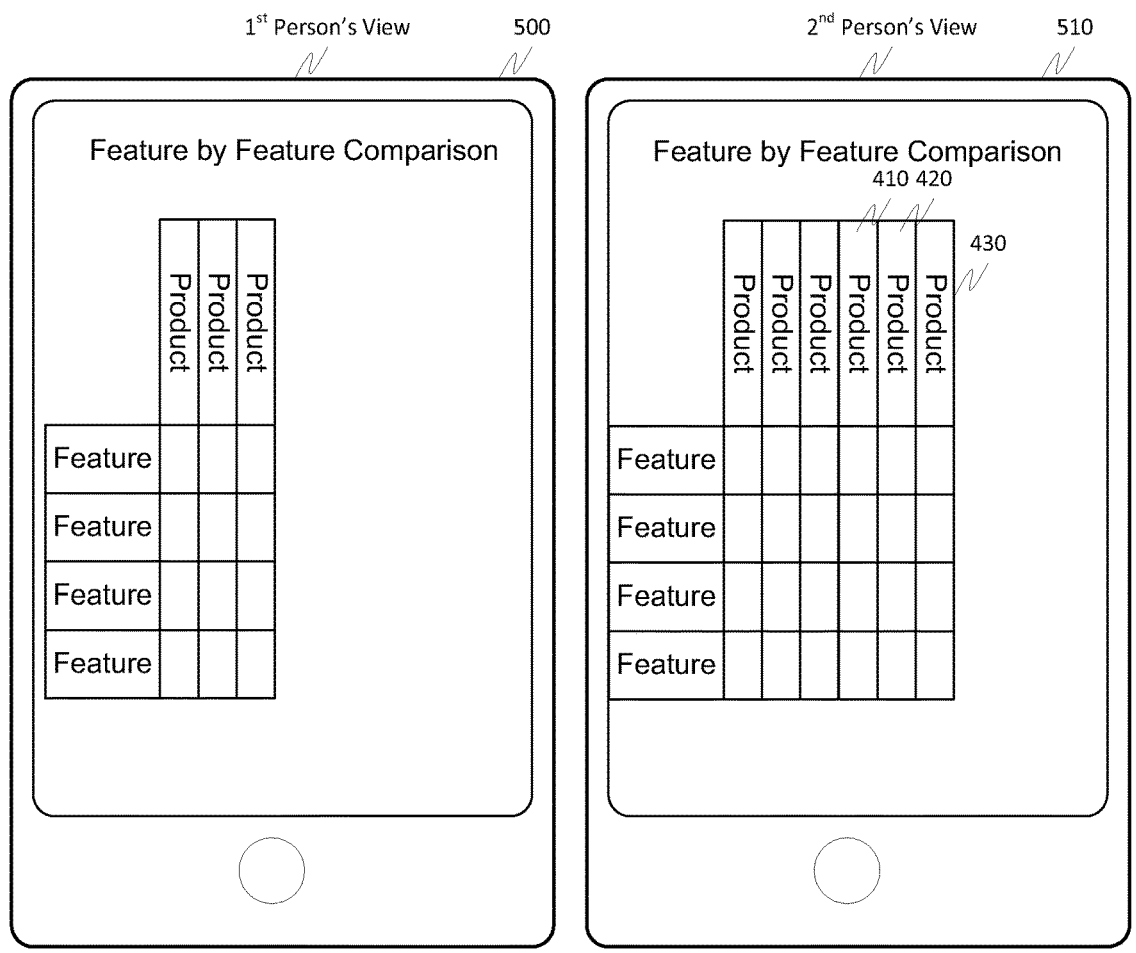
FIG. 5 illustrates different versions of displaying information.
Figure 5:
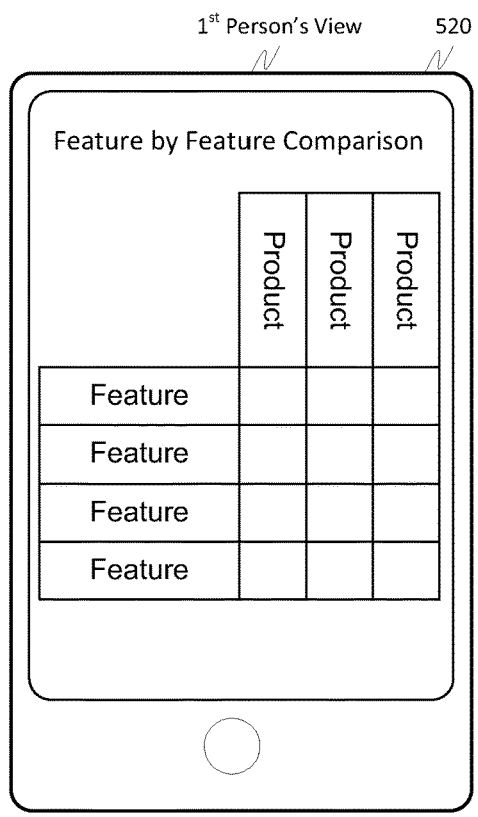

FIG. 5 illustrates in greater detail the results of the tagging or identifying of sensitive information from FIG. 4. In particular, in FIG. 5, a first person's view is illustrated on display device 500 and a second person's view is illustrated on display device 510. Here, in the first person's view, information associated with products 410/430 has been hidden and the buttons 440 and 450 are not displayed to the first person. However, on a second device, or in second person's view on the same device, product information associated with products 410-430 is shown as illustrated in FIG. 5, on display device 510. As illustrated in the first person's view in graphical user interface 520 in FIG. 5 however, in cooperation with the reconfiguration module 145, the feature-by-feature comparison chart has been reconfigured, here optionally re-sized, re-centered, and re-formatted to conceal the fact that product information 420-430 has been hidden. Here, in this optional exemplary first person's view, the first person would not be aware that tagged sensitive information has been removed from the feature by feature comparison chart as they might suspect when viewing the display on display device 500.

In accordance with another exemplary embodiment, and further in cooperation with the information restriction module 155, processor 130, and memory 135, any type of information can be restricted from dissemination, viewing or the like, either on the same device relative to another person, or between devices. For example, information can include one or more of data, applications, image information, multimedia information, contact information, or in general any information for the information instruction module 155 cooperating with rules stored in the memory 135 to restrict the dissemination of sensitive information.

As will be appreciated, restriction of displaying sensitive information need not only be in one-direction, such as sensitive information on a first device not displayed on a second device, but similarly sensitive information on a second device can be excluded from display on a first device. Even more particularly, and in cooperation with the collaboration detection module 125, which is capable of operating in real-time, when information is being shared between a plurality of devices, tags can be respectively set for sensitive information on any one or more of the devices, with the tag selectively identifying which of the devices, or which of the plurality of devices, are not to receive or display the sensitive information. In accordance with one exemplary embodiment, and in cooperation with rules stored in memory 135, the tags or identifiers can include information such as which devices may receive the sensitive information, and which devices are to be excluded from receiving the sensitive information. For example, in a collaborative work environment including Jim, Pat and Bob, rules may indicate that information is to be shared/viewable as summarized in the following table.

| Partici-pants | Spreadsheets | Content Privileges | | |
|---|---|---|---|---|
| | | Sales Information | Templates | Chat |
| Jim | View All | View/Edit All | View/Edit All | All |
| Pat | View All | Hide All | View Only | All |
| Bob | Hide Columns 8-10 of Spreadsheet xyz.xls | Hide All except Personal Sales Results | Hide | All except Customer Names |

Figure 6:
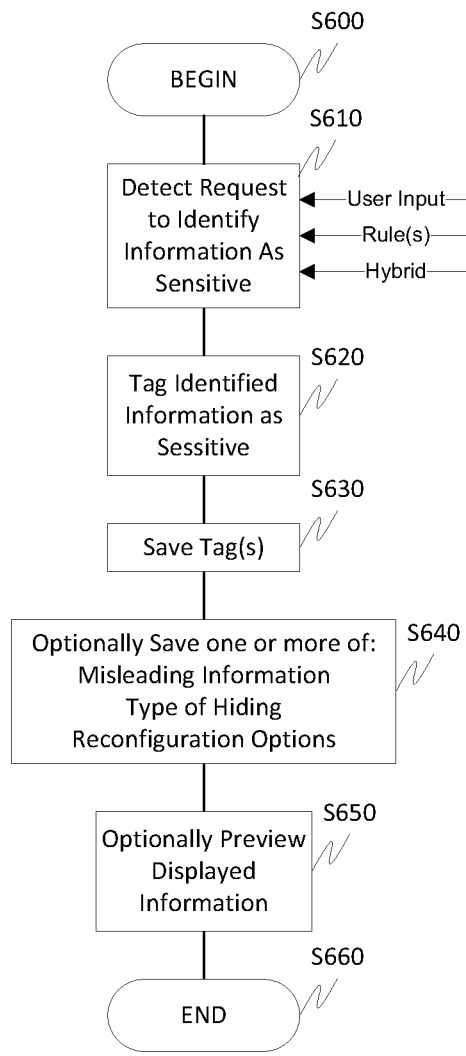
FIG. 6 is a flowchart outlining an exemplary method for identifying sensitive information.

FIG. 6 is a flowchart outlining an exemplary method for identifying information as sensitive. In particular, control begins in step S600 and continues step S610. In step S610, the request to identify information as sensitive is detected. For example, the user can select a button, and/or invoke a routine that allows them to classify and tag or identify information as sensitive. The identification of information as sensitive can be accomplished based on one or more techniques including receiving user input that directly identifies the information as sensitive, based on one or more rules, such as always hiding social security numbers, checking account numbers, banking information, or the like, or some combination thereof. Once information, or a class of information, such as social security numbers, fields associated with banking account numbers, or the like, has been identified as sensitive, in step S620 the tag is associated with this information, the tag identifying the information as sensitive, with the tag optionally including which one or more parties or devices the hiding of the sensitive information applies to. For example, the rules can indicate that field "X" can be shared with a second and third party, but are to be hidden from the fourth and fifth parties with a reconfiguration of that portion of the interface performed such that the fourth and fifth parties do not even know that field X was present in the graphical user interface. All this information can then be saved in step S630, with control continuing to step S640.

In step S640, additional information can be associated with a tag, as eluded to above, such as to whether the information should be replaced with misleading information, the type of hiding that should be performed, such as obfuscation, reconfiguration, blocking out, or in general any type of hiding, and specifics relating to re-configuration if re-configuration is to be performed. For example, reconfiguration can include a wholesale reconfiguration of the interface such that it appears that no content is missing, as illustrated in the first person's view shown in display device 520 of FIG. 5. In order to ensure the tags have been correctly set, in step S650 a preview can be performed to allow the user to toggle between various views that show, for example, in a first view, the sensitive information and associated tags, in a second view the result of the hiding, and in a third view the results of the hiding of the sensitive information after a re-configuration has been performed. Control then continues to step S660 where the control sequence ends.

Figure 7:
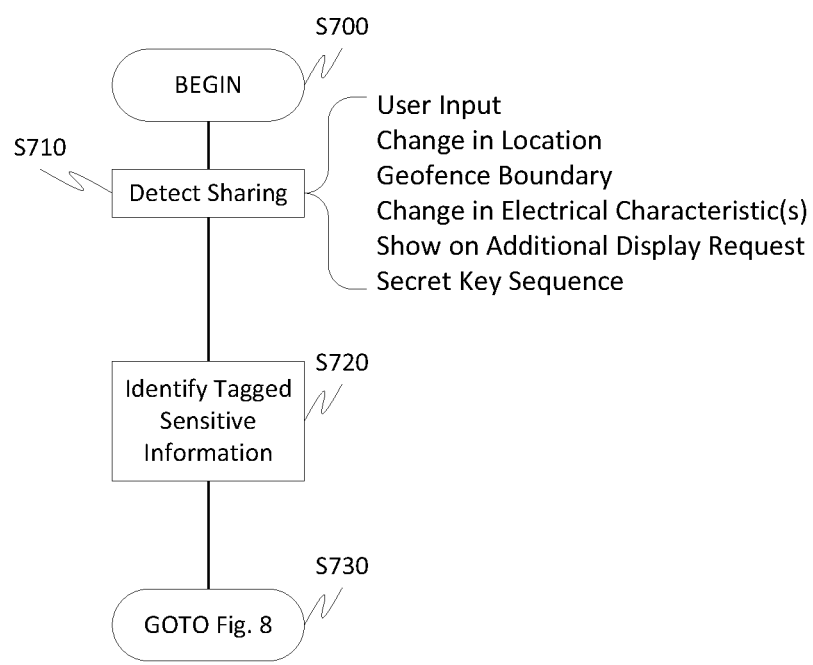
FIG. 7 is a flowchart outlining an exemplary method for detecting sharing.

FIG. 7 is a flowchart outlining an exemplary method for triggering the hiding of information tagged or identified as sensitive. In particular, control begins in step S700 and continues to step S710. In step S710, sharing is detected. For example, the sharing or the handing of the device to another party can be based on one or more of user input, change in location, geofence boundary, change in electrical characteristics, shown on additional display request and a secret key sequence. For example, user input can be the detection of a request for a user to share their screen and/or user indicating that they are handing the device to another party and that sensitive information should be hidden. For a change in location, rules can be established that within a certain boundary, such as geographic boundary, the information tagged as sensitive is not hidden, however outside of this location the information tagged as sensitive is hidden. For geofence boundaries, as discussed above, one or more geofences can be established that cooperate with one or more rules that control when tagged sensitive information should be hidden or otherwise obfuscated. For a change in electrical characteristics, as discussed above, one or more of the change in resistance, conductance, and biometric information can be monitored such that characteristics associated with a first user show the sensitive information, and characteristics associated with a second user cause the triggering of the hiding of the sensitive information.

In accordance with an optional exemplary embodiment, the device can be associated with multiple displays where, for example, sensitive information is shown on a first display associated with the device, but not shown on a second display associated with the device. Detection of sharing can also be based on a secret key sequence, which may be particularly useful in relation to the embodiment discussed in relation to FIG. 1.

For example, a sales person could enter a secret key sequence upon handing the device to a customer, the secret key sequence triggering the hiding of sensitive information. Upon the device being returned to the sales person, the sales person could then again enter the secret key sequence, which would trigger the device to display the sensitive information. Control then continues to step S720.

In step S720, and after sharing has been detected, a procedure is performed to identify whether information, if any, has been tagged as sensitive. Control then continues to step S730 where control jumps to FIG. 8.

Figure 8:
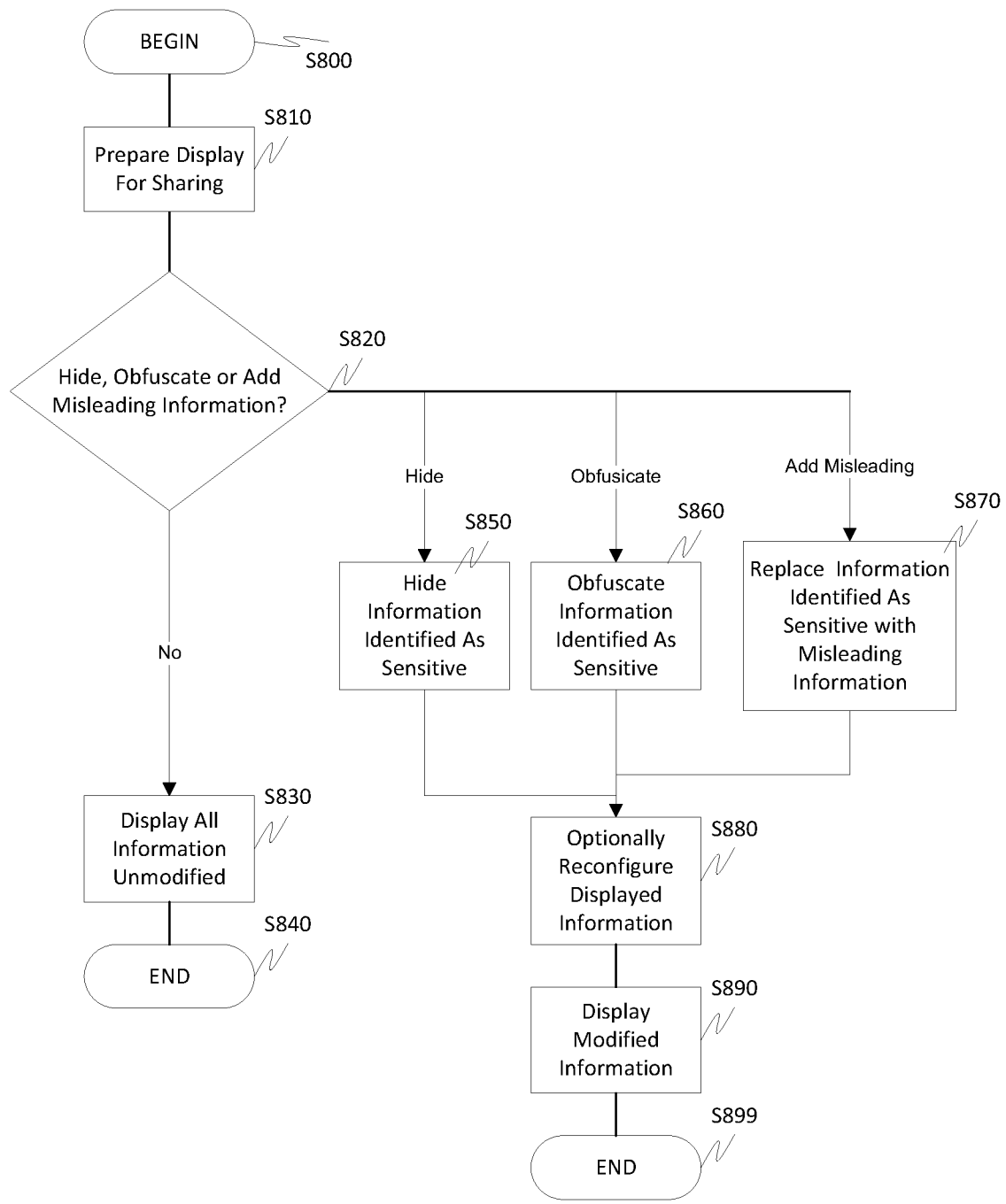
FIG. 8 is a flowchart outlining an exemplary method for limiting the dissemination of sensitive information.

In particular, FIG. 8 illustrates a flowchart outlining an exemplary method for protecting sensitive information. Control begins in step S800 and continues to step S810. In step S810, the shared information is prepared for display. Next, in step S820 a determination is made whether there is tagged sensitive information, and if so, how to handle this sensitive information. If no information is identified as sensitive, control continues to step S830 where all information is displayed unmodified with control continuing to step S840 where the control sequence ends.

Otherwise, control continues to step S850, step S860 or step S870, where hiding, obfuscating or the adding of misleading information, respectively, is performed. Even more particularly, in step S850, sensitive information is hidden based on information in the tag. In step S860, sensitive information is obfuscated, again, based on information in the tag optionally in cooperation with one or more rules. In step S870, sensitive information is replaced with other information, again based on information in a tag and optionally in cooperation with one or more rules, one or more templates, and information obtained from one or more other sources. After the sensitive information has been concealed in accordance with one or more of the above techniques, control continues to step S880 where the information to be displayed to another party can optionally be re-configured. Then, in step S890, information remaining after sensitive information has been hidden, obfuscated, replaced with misleading information, and optionally re-configured is displayed. Control then continues to step S899 where the control sequence ends.

The hidden, obfuscated or misleading information can then again be displayed to an eligible party upon, for example, entry of the correct key sequence, scanning of the owner's/manager's fingerprint, etc., as discussed.

While the above-described flowcharts have been discussed in relation to a particular sequence of events, it should be appreciated that changes to this sequence can occur without materially effecting the operation of the embodiments. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols herein can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems described herein is dependent on the speed and/or efficiency requirements of the system, the particular function, and the particular software or hardware systems or microprocessor or microcomputer systems being utilized. The security systems, methods and protocols illustrated herein can be readily implemented in hardware and/or software using any known or later developed systems or structures, devices and/or software by those of ordinary skill in the applicable art from the functional description provided herein and with a general basic knowledge of the computer and security arts.

Moreover, the disclosed methods may be readily implemented in software that can be stored on a non-transitory storage medium, executed on a programmed general-purpose computer with the cooperation of a controller and memory, a special purpose computer, a microprocessor, or the like. In these instances, the systems and methods described herein can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided systems, apparatuses and methods for facilitating exchange of information. While the embodiments have been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A method for restricting dissemination of information comprising:
   selecting, by a processor, sensitive information displayed within a user interface based on touch input;
   detecting, by a processor, that the sensitive information should be one or more of hidden, obfuscated, or replaced; and
   when a device is handed from a first party allowed to see the sensitive information to a second party, performing, by the processor, the one or more of hiding, obfuscating, or replacing the sensitive information within the user interface until an identity of the second party is confirmed, wherein performing the one or more of hiding, obfuscating, or replacing the sensitive information until the identity of the second party is confirmed is based on detecting when the device changes hands from the first party allowed to see the sensitive information to the second party, wherein detecting when the device changes hands from the first party allowed to see the sensitive information to the second party is based on one or more of an electrical, an inductive, or a resistive characteristic associated with how each of the first and second parties hold a case of the device.

2. The method of claim 1, further comprising reconfiguring information other than the sensitive information, wherein reconfiguring the information other than the sensitive information is adding misleading information.

3. The method of claim 1, wherein the device has multiple displays and wherein the sensitive information is displayed in a first one of the multiple displays and not displayed on a second one of the multiple displays.

4. The method of claim 1, further comprising reconfiguring information other than the sensitive information, wherein the reconfiguring includes one or more of resizing, centering, reformatting or reorganizing.

5. The method of claim 1, further comprising:
   establishing one or more hierarchal levels, each hierarchal level having a preconfigured policy that governs display of the sensitive information, one or more individuals being assignable to the one or more hierarchal levels; and
   reading one or more rules and performing one or more of the hiding, obfuscating or replacing of the sensitive information.

6. The method of claim 1, wherein the sensitive information is a column in a spreadsheet that is hidden and further comprising reconfiguring, based on hiding the column in the spreadsheet, one or more other columns in the spreadsheet so that it is not obvious that the column in the spreadsheet has been hidden.

7. The method of claim 1, wherein performing the one or more of hiding, obfuscating, or replacing the sensitive information is based on the device exiting a geofence boundary.

8. The method of claim 6, wherein reconfiguring the column in the spreadsheet comprises removing the column in the spreadsheet, centering the spreadsheet, and reformatting the spreadsheet to conceal the removed column.

9. The method of claim 1, wherein the one or more of the electrical, the inductive, or the resistive characteristic associated with how the first and second parties hold the case of the device does not use biometric information.

10. A system that restricts dissemination of information comprising:
    a microprocessor; and
    a computer readable medium, coupled with the microprocessor and comprising microprocessor readable and executable instructions that cause the microprocessor to execute:
       an obfuscation module that detects that sensitive information displayed within a user interface based on touch input should be one or more of hidden, obfuscated or replaced; and
       when a device is handed from a first party allowed to see the sensitive information to a second party, the obfuscation module performs the one or more of hiding, obfuscating, or replacing of the sensitive information within the user interface until an identity of the second party is confirmed, wherein performing the one or more of hiding, obfuscating, or replacing the sensitive information until the identity of the second party is confirmed is based on detecting when the device changes hands from the first party allowed to see the sensitive information to the second party, wherein detecting when the device changes hands from the first party allowed to see the sensitive information to the second party is based on one or more of an electrical, an inductive, or a resistive characteristic associated with how each of the first and second parties hold a case of the device.

11. The system of claim 10, wherein a tag associated with the sensitive information is read.

12. The system of claim 10, further comprising executable instructions that cause the microprocessor to execute a reconfiguration module that reconfigures information other than the sensitive information.

13. The system of claim 10, wherein the obfuscation module associates a tag with the sensitive information.

14. The system of claim 10, further comprising executable instructions that cause the microprocessor to execute a collaboration detection module that detects a collaborative communication session.

15. The system of claim 10, further comprising executable instructions that cause the microprocessor to execute a reconfiguration module that reconfigures information other than the sensitive information, wherein the reconfiguring information other than the sensitive information includes one or more of resizing, centering, reformatting, or reorganizing.

16. The system of claim 10, further comprising:
a memory which stores:
one or more hierarchal levels, each hierarchal level having a preconfigured policy that governs display of the sensitive information, one or more individuals being assignable to the one or more hierarchal levels; and
one or more rules that control one or more of the hiding, obfuscating, or replacing of the sensitive information.

17. The system of claim 10, wherein the sensitive information is one or more of textual information, voice information, video information, graphical information, data, misleading information, or cover-up information.

18. The system of claim 10, wherein the sensitive information is a column in a spreadsheet that is hidden and wherein the obfuscation module reconfigures, based on hiding the column in the spreadsheet, one or more other columns in the spreadsheet so that it is not obvious that the column in the spreadsheet has been hidden.

19. A system that restricts dissemination of information comprising:
a microprocessor; and
a computer readable medium, coupled with the microprocessor and comprising microprocessor readable and executable instructions that cause the microprocessor to execute:
an obfuscation module that detects that sensitive information displayed within a user interface based on touch input should be one or more of hidden, obfuscated, or replaced; and
when a device is handed from a first party allowed to see the sensitive information to a second party, the obfuscation module:
performs the one or more of hiding, obfuscating, or replacing of the sensitive information within the user interface until an identity of the second party is confirmed, wherein performing the one or more of hiding, obfuscating, or replacing the sensitive information is based on detecting when the device changes hands from the first party allowed to see the sensitive information to the second party; and
reconfigures information other than the sensitive information by adding misleading information until the identity of the second party is confirmed.

20. The system of claim 19, wherein detecting when the device changes hands from a party allowed to see the sensitive information to another party is based on one or more of an electrical, an inductive, or a resistive characteristic associated with how the first and second parties hold a case of the device.

* * * * *